(12) United States Patent
Bohn (10) Patent No.: US 6,429,422 B1
(45) Date of Patent: Aug. 6, 2002

(54) SCANNER NAVIGATION SYSTEM WITH VARIABLE APERTURE

(75) Inventor: David D Bohn, Ft Collins, CO (US)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/439,574

(22) Filed: Nov. 12, 1999

(51) Int. Cl.[7] .................................................. H01J 3/14

(52) U.S. Cl. ........................................ 250/234; 358/473

(58) Field of Search ................................. 250/234, 216, 250/235, 214 AL; 358/473, 474, 488, 497; 235/462.32, 462.35, 462.43, 462.45; 396/449–451, 483–493

(56) References Cited

U.S. PATENT DOCUMENTS

| | | | | |
|---|---|---|---|---|
| 4,812,913 A | * | 3/1989 | Knop et al. .................. | 358/474 |
| 5,306,908 A | | 4/1994 | McConica et al. .......... | 250/234 |
| 5,381,020 A | | 1/1995 | Kochis et al. .............. | 250/566 |
| 5,432,576 A | * | 7/1995 | SanGregory et al. ....... | 396/449 |
| 5,552,597 A | | 9/1996 | McConica .................. | 250/234 |
| 5,578,813 A | | 11/1996 | Allen et al. ............... | 250/208.1 |
| 5,586,212 A | | 12/1996 | McConica et al. .......... | 385/146 |
| 5,644,139 A | | 7/1997 | Allen et al. ................. | 250/557 |

* cited by examiner

Primary Examiner—Que T. Le
Assistant Examiner—Thanh X. Luu (57) ABSTRACT

A portable scanner for document imaging includes at least one position detector. The position detector has an optical detector and an aperture assembly adjacent the optical detector. The aperture assembly has a first aperture size and a second aperture size. The aperture assembly is adjustable between the first aperture size and the second aperture size.

3 Claims, 10 Drawing Sheets

SCANNER NAVIGATION SYSTEM WITH VARIABLE APERTURE

FIELD OF THE INVENTION

This invention relates to portable image scanners in general and more specifically to a portable scanner navigation system having a variable aperture.

BACKGROUND OF THE INVENTION

Optical scanner devices are well-known in the art and produce machine-readable image data signals that are representative of a scanned object, such as a photograph or a page of printed text. In a typical scanner application, the image data signals produced by an optical scanner may be used by a personal computer to reproduce an image of the scanned object on a suitable display device, such as a CRT or a printer.

A hand-held or portable scanner is an optical scanner which is designed to be moved by hand across the object or document being scanned. The hand-held scanner may be connected directly to a separate computer by a data cable. If so, the data signals produced by the hand-held scanner may be transferred to the separate computer "on the fly," i.e., as the image data are collected. Alternatively, the portable hand-scanner may include an on-board data storage system for storing the image data. The image data may then be uploaded to a separate computer after the scanning operation is complete by any convenient means.

Hand-held or portable optical scanners are well-known in the art and various components thereof are disclosed in U.S. Pat. No. 5,552,597 of McConica for "Hand-Held Scanner having Adjustable Light Path", U.S. Pat. No. 5,586,212 of McConica, et al., for "Optical Wave Guide for Hand-Held Scanner," U.S. Pat. No. 5,381,020 of Kochis, et al., for "Hand-Held Optical Scanner with Onboard Battery Recharging Assembly," and U.S. Pat. No. 5,306,908 of McConica, et al., for "Manually Operated Hand-Held Optical Scanner with Tactile Speed Control Assembly," all of which are hereby incorporated by reference for all that they disclose.

A typical hand-held optical scanner may include illumination and optical systems to accomplish scanning of the object. The illumination system illuminates a portion of the object (commonly referred to as a "scan region"), whereas the optical system collects light reflected by the illuminated scan region and focuses a small area of the illuminated scan region (commonly referred to as a "scan line") onto the surface of a photosensitive detector positioned within the scanner. Image data representative of the entire object then may be obtained by sweeping the scan line across the entire object, usually by moving the hand-held scanner with respect to the object. By way of example, the illumination system may include a light source (e.g., a fluorescent or incandescent lamp or an array of light emitting diodes (LEDs)). The optical system may include a lens and/or mirror assembly to direct and focus the image of the illuminated scan line onto the surface of the detector. The optical system may also comprise a reduction optics system for reducing the reflected light onto a very small detector.

The photosensitive detector used to detect the image light focused thereon by the optical system may be a contact image sensor, an array of photodetectors which act together to capture the image of a scan line. A typical individual photodetector changes electrical capacitance as it is exposed to light. As the intensity of the light reflected from the image onto the photodetector changes, the electrical current passing through the photodetector varies. Thus a photodetector may be used to detect light and dark regions on an image.

The term "image light" as used herein refers to the light that is focused onto the surface of the detector array by the optical system. Depending on the type of scanner and the type of document, the image light may be reflected from the document or object being scanned or it may be transmitted through the object or document. The image light may be converted into digital signals, or image data, in essentially three steps. First, each photodetector converts the light it receives into an electric charge. Second, the charges from the photodetectors are converted into analog voltages by an analog amplifier. Finally, the analog voltages are digitized by an analog-to-digital (A/D) converter. The digital image data then may be processed and/or stored as desired.

A typical portable scanner may also include a position sensing system, or navigation system, to keep track of the scanner's position with respect to the object. The navigation system allows a portable scanner to image an object or document which is larger and wider than the scanner by combining scanned strips or swaths into a single image. As the portable scanner is moved back and forth across the object to scan all areas of the object, the navigation system keeps track of the position of the scanner. The various scanned swaths may then be "stitched" together using the position information collected by the position sensing system.

One type of navigation system employs optical detectors which generate image data representing a two-dimensional portion of the surface of the object. The optical detectors capture the image of several target locations on the object. An optical lens and a fixed aperture are positioned adjacent each optical detector to focus and direct light reflected from the object onto the optical detectors. A processor analyzes the image data to identify the positions of distinct features located on the surface of the object relative to the optical sensor. As the scanner is moved relative to the object, the positions of these distinct features relative to the optical sensor move accordingly. The processor measures these position changes to determine the displacement and direction of movement of the scanning device relative to the surface of the object. The processor may also integrate the displacement to determine the velocity of the scanner relative to the surface of the object. Examples of position sensors, or navigators, that image two-dimensional areas of an object are disclosed in U.S. Pat. No. 5,644,139 of Allen, et al., for "Navigation Technique for Detecting Movement of Navigation Sensors Relative to an Object," and U.S. Pat. No. 5,578,813 of Allen, et al., for "Freehand Image Scanning Device Which Compensates for Non-linear Movement," both of which are hereby incorporated by reference for all that they disclose.

Portable scanners of the type described above are not without their problems. For example, the efficacy of the navigation system varies greatly according to the content and material of the object. Factors affecting the navigation system include the color of the object, texture, coating, and content. White printer paper typically has a reflectance of about 80%, while black glossy magazine pages have a reflectance of less than about 3%. Glossy objects also have a large specular component to the reflectance, requiring a grazing illumination with a large angle of incidence on the object. Thus the amount of light reflected from the object to the navigator optical detector is much higher for a white object than for a black object.

The fixed size of the aperture in a navigator is typically determined by balancing the requirements for the various types of objects that will be scanned. A further consideration is the depth of field required by the navigator. The smaller the aperture, the greater the depth of field. Thus, a portable scanner with a smaller aperture is less susceptible to focus errors caused by tilting the scanner over the object. However, the fixed aperture does not provide an ideal amount of light to the navigator optical detector for all object types. Therefore, a portable scanner navigation system which performs well on white printer paper may be unable to adequately track scanner movement on black glossy magazine paper.

A need therefore exists for a portable scanner navigation system which is more effective when used with varied types of objects with varied content. A further need exists for a portable scanner navigation system which can optimize the depth of field for varied types of objects.

SUMMARY

To assist in achieving the aforementioned need, the inventor has devised a portable scanner having a navigation system with a variable aperture. The aperture size is varied according to the type of object to be scanned, increasing the efficacy of the navigation system over a range of object types.

The invention may comprise a portable scanner for document imaging having at least one position detector. The at least one position detector comprises an optical detector and an aperture assembly adjacent the optical detector. The aperture assembly has a first aperture size and a second aperture size. The aperture assembly is adjustable between the first aperture size and the second aperture size.

The invention may also comprise a method for varying the intensity of light incident on a navigator photodetector in a portable scanner. The method comprises providing an aperture assembly adjacent the navigator photodetector in the portable scanner, wherein the aperture assembly has a variable aperture size which may be adjusted to vary the intensity of light incident on the navigator photodetector. The method also comprises determining an optimal aperture size which best enables the navigator photodetector to detect a position of the portable scanner. The method also comprises adjusting the aperture assembly so that the variable aperture size is set substantially at the optimal aperture size.

The invention may also comprise a portable scanner for document imaging, comprising at least one position detector, an optical detector located in the position detector, and means for varying a cross-sectional area of a light path to the optical detector.

BRIEF DESCRIPTION OF THE DRAWING

Illustrative and presently preferred embodiments of the invention are shown in the drawing, in which.

DESCRIPTION OF THE PREFERRED EMBODIMENT

The drawing and description, in general, disclose a portable scanner 10 for document imaging having at least one position detector 44. The at least one position detector 44 comprises an optical detector 50 and an aperture assembly 60 adjacent the optical detector 50. The aperture assembly 60 has a first aperture size 84 and a second aperture size 86. The aperture assembly 60 is adjustable between the first aperture size 84 and the second aperture size 86.

The drawing and description also disclose a method for varying the intensity of light 64 incident on a navigator photodetector 44 in a portable scanner 10. The method comprises providing an aperture assembly 60 adjacent the navigator photodetector 50 in the portable scanner 10, wherein the aperture assembly 60 has a variable aperture size which may be adjusted to vary the intensity of light 64 incident on the navigator photodetector 50. The method also comprises determining an optimal aperture size which best enables the navigator photodetector 50 to detect a position of the portable scanner 10. The method also comprises adjusting the aperture assembly 60 so that the variable aperture size is set substantially at the optimal aperture size.

The drawing and description also disclose a portable scanner 10 for document imaging, comprising at least one position detector 44, an optical detector 50 located in the position detector 44, and means for varying a cross-sectional area of a light path 46 to the optical detector 50.

A portable scanner 10 having a navigation system 12 with a variable aperture 14 (FIG. 1) according to the present invention may be used to scan an object 16, such as a document 20 with written text 22 provided thereon. For example, the entire document 20 may be scanned by moving the portable scanner 10 over the document 20 along a meandering or curvilinear scanning path 24. As will be explained in greater detail below, the portable scanner 10 having a navigation system 12 with a variable aperture 14 is adapted to navigate over widely varying types of objects 16, such as white printer paper or glossy black magazine paper.

Figure 1:
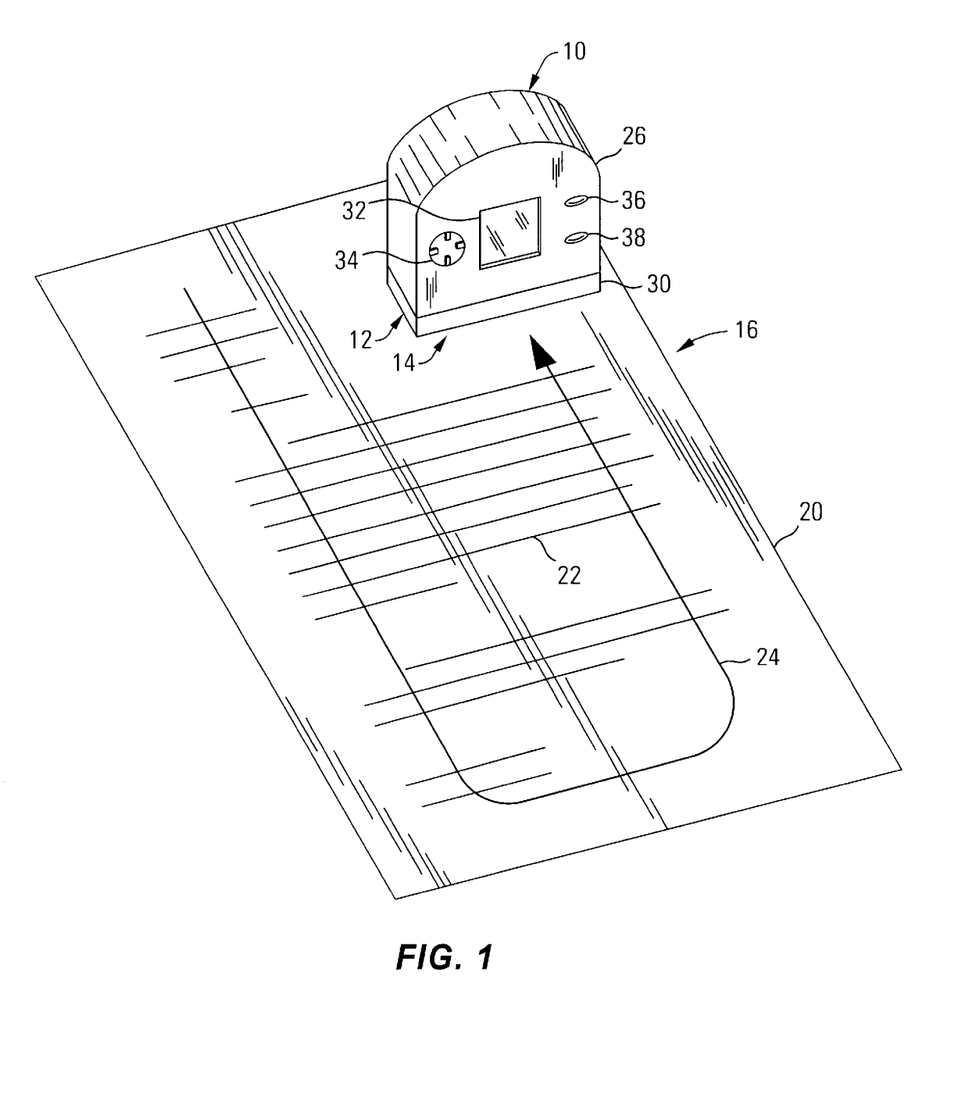
FIG. 1 is a perspective view of a portable scanner device having a navigation system with a variable aperture.
Figure 2:
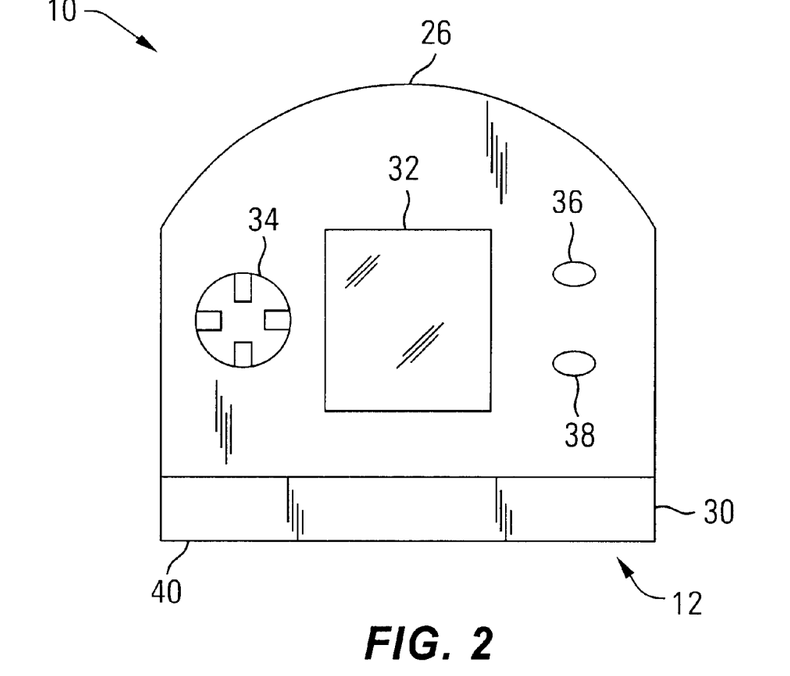
FIG. 2 is a top view of the portable scanner of FIG. 1.
Figure 3:
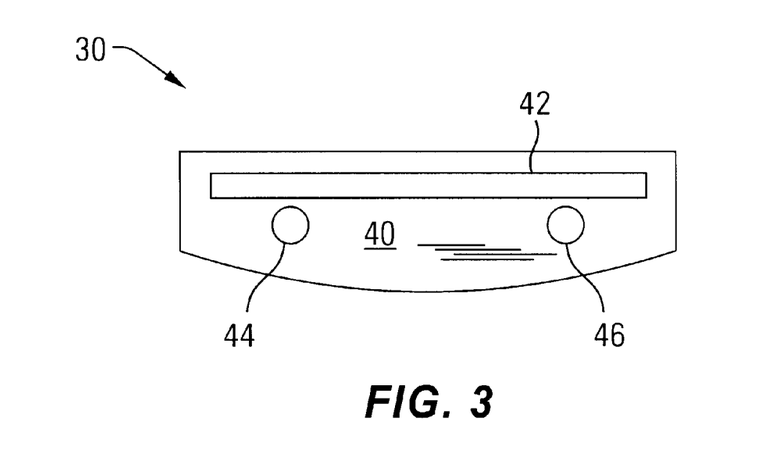
FIG. 3 is a bottom view of the portable scanner of FIG. 1.

Referring now to FIGS. 1, 2, and 3 simultaneously, one embodiment of the portable scanner 10 having a navigation system 12 with a variable aperture 14 comprises a main housing portion 26 having an image head portion 30 associated therewith. The main housing portion 26 of the portable scanner 10 may be sized to receive the various electronic components and other devices (not shown) required for the operation of the portable scanner 10. For example, in addition to housing the various electronic components (not shown) that may be required or desired for the operation of the portable scanner 10, the main housing portion 26 may also be provided with a display device 32, along with various buttons or switches 34, 36, and 38 to control the function and operation of the portable scanner 10. The main housing portion 26 may also be sized to receive a suitable power source, such as a battery (not shown), to provide electrical power to the portable scanner 10.

The image head portion 30 of the portable scanner 10 is configured to receive an optical imaging assembly and an illumination system (not shown). The face or contact surface 40 of the image head portion 30 may be provided with an elongate scan window 42 therein which allows the illumination system to illuminate a target region on the object 16. The scan window 42 also allows image light reflected by the illuminated target region to be received by the optical imaging assembly. As the portable scanner 10 is moved over the object 16, the optical imaging assembly produces an image signal based on the image light reflected through the scan window 42. Image data contained in the image signal may then be processed or manipulated by an image processing system (not shown) to produce image data that are representative of the object 16.

The image head portion 30 also includes one or more position detectors 44 and 46, or navigators, (FIG. 3) which optically detect the surface structure of the object 16 in order to track movement of the portable scanner 10 over the object 16. As the portable scanner 10 is moved over the object 16, the navigators 44 and 46 produce location information. The image data that are formed as the portable scanner 10 is moved along the curvilinear scanning path 24 over the object 16 represent a curvilinear scan swath or strip, which must then be stitched together using the location information provided by the navigators 44 and 46.

Unfortunately, the reflectance of different types of objects 16 can vary widely, hindering operation of the navigators 44 and 46. White printer paper has a reflectance of about 80%, while glossy black magazine paper has a reflectance of less than about 3% with the grazing illumination required to detect inherent or printed features on the paper. This makes it difficult for a single static navigator design to be able to operate well on different types of objects 16. The navigators 44 and 46 need to receive enough light reflected from the object 16 that a strong signal is provided, raising the signal-to-noise ratio. However, too much light incident on the navigators 44 and 46 will saturate them. If the signal-to-noise ration is too low, the portable scanner 10 will be unable to distinguish features on the object 16 and will lose its navigation information. If, on the other hand, too much light is received by the navigators 44 and 46, the photodetectors (e.g., 50) will be saturated, resulting in bright, washed out images with little detail. A fixed aperture navigator designed to operate on both white printer paper and glossy, dark magazine images compromises by performing marginally well on both, but excelling on neither. Furthermore, the wide aperture required to operate on dark objects has a narrow depth of field, causing the navigators 44 and 46 to lose focus if the portable scanner 10 is tilted even slightly.

The intensity of light reflected from the object 16 and incident on the navigators 44 and 46 may be varied by adjusting the amount of illumination from a navigator light emitting diode (LED) (e.g., 54), but this solution is greatly limited by the restrictions on size, power, and required angle of illumination.

The intensity of light incident on the navigators 44 and 46 may also be varied by adjusting the integration time. The navigators 44 and 46 capture a series of discrete images as the portable scanner 10 is moved over the object 16. The integration time is the amount of time information is gathered from the photodetectors in the navigators 44 and 46 for each image. However, as the integration time is increased to form a brighter image, the portable scanner 10 must be moved more slowly over the object 16. If a long integration time is used and the portable scanner 10 is moved too quickly, the navigation images will be blurred and the portable scanner 10 will lose its navigation information.

The portable scanner 10 having a navigation system 12 with a variable aperture 14 can be used on objects 16 with widely varying reflectance values. As the portable scanner 10 having a navigation system 12 with a variable aperture 14 is moved over the object 16, the aperture size is increased over low reflectance regions and decreased over high reflectance regions. Thus, an optimum signal level is maintained for the navigators 44 and 46, and the depth of field is as large as possible over each of the regions with different reflectance values on the object 16.

The portable scanner 10 having a navigation system 12 with a variable aperture 14 may be operated as follows to scan an object 16, such as document 20 with written text 22 thereon. As a first step, the user (not shown) would set up or initialize the portable scanner 10 to perform the scanning operation by actuating the appropriate buttons or switches (e.g., 34, 36, and 38) in accordance with the particular operational sequence for the specific scanner device.

The user holds the contact surface 40 or face of the portable scanner 10 against the document 20 and initiates the scanning operation. The user then moves the portable scanner 10 across the document 20 as the optical imaging assembly and navigators 44 and 46 capture the scan swaths and location information. Stitching software, either in the portable scanner 10 or in an external computer, can then reassemble a unified image of the document 20 from the scan swaths captured by the optical imaging assembly and from the location information captured by the navigators 44 and 46. Exemplary stitching algorithms are disclosed in U.S. Pat. No. 5,578,813 of Allen, et al., for "Freehand Image Scanning Device which Compensates for Non-Linear Movement," mentioned above. However, since the details of the stitching algorithm are not necessary to understand or practice the present invention, the particular stitching algorithm that may be utilized in a portable scanner 10 having a navigation system 12 with a variable aperture 14 will not be described in further detail herein.

Having briefly described the portable scanner 10 having a navigation system 12 with a variable aperture 14, as well as some of its more significant features and advantages, the various embodiments of the portable scanner 10 will now be described in detail. However, before proceeding with the detailed description it should be noted that the configurations of the portable scanner 10 having a navigation system 12 with a variable aperture 14 shown and described herein are exemplary. It should also be noted that while the portable scanner 10 is shown and described herein as it may be used to scan an object 16, such as a document 20 with written text 22 thereon, it is not limited to use with any particular type of object 16. Indeed, the portable scanner 10 may be used to scan almost any type of object imaginable.

Referring now primarily to FIGS. 4–7, a preferred embodiment of the portable scanner 10 having a navigation system 12 with a variable aperture 14 comprises a housing 26 which is molded of a polycarbonate material. The housing 26 contains electronic systems for processing, storing, manipulating and transmitting digital images. A display device 32 is placed in the housing 26 to prompt the user in the use of the portable scanner 10 and to display scanned images. The display panel 32 is sized to fit in the housing 26 and to leave enough room for other necessary elements, such as control buttons 34, 36, and 38. The display panel 32 is preferably a low cost monochrome liquid crystal display (LCD) having an adequate resolution to display scanned images and a user interface (menus, instructions, etc.) Alternatively, the display panel 32 may comprise another type of display, such as a thin-film transistor (TFT) display, a gas plasma display, etc, and may be either color or monochrome as desired.

Figure 4:
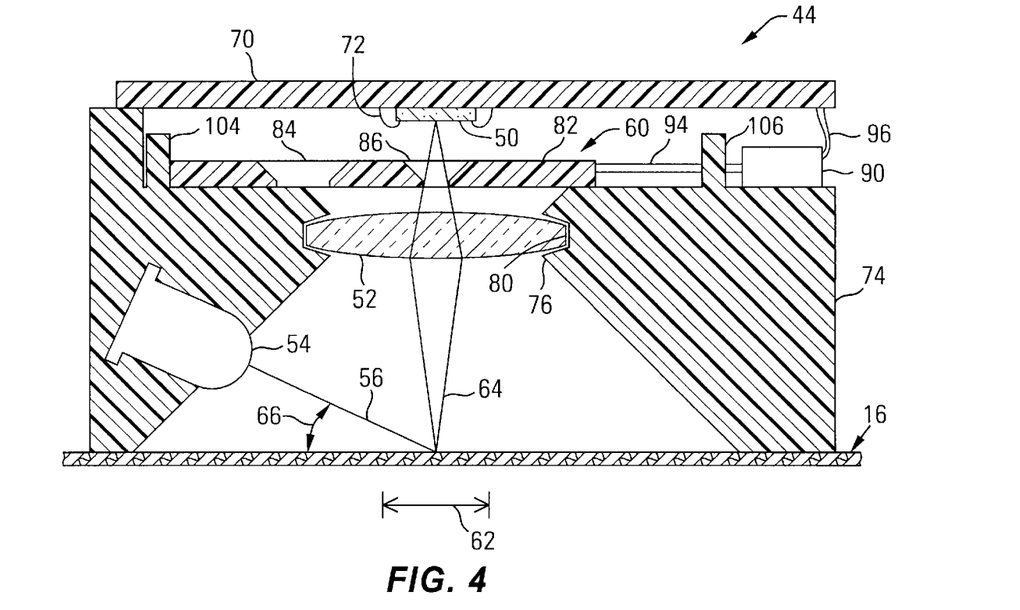
FIG. 4 is a cross-sectional side view of a portable scanner navigator with a slidable variable circular aperture.

An image head portion 30 is located in the housing 26 and contains the imaging systems, including an optical imaging assembly (not shown) and an illumination system (not shown), which are directed through a scan window 42 in the contact surface 40 of the portable scanner 10.

The illumination system produces a plurality of light rays which illuminate a target region on the object 16 through the scan window 42. The illumination system may comprise any of a wide range of light sources suitable for providing a plurality of light rays. By way of example, in one preferred embodiment, the illumination system comprises a plurality of light emitting diodes which are positioned in spaced-apart relation in the image head portion 30. Each light emitting diode 74 may comprise an LED part number HSMA-S690, available from Hewlett-Packard Company of Palo Alto, Calif.

The optical imaging assembly is responsive to image light reflected from the object 16. The optical imaging assembly produces an image signal representative of the object 16. The optical imaging assembly may comprise any of a wide variety of imaging systems now known or that may be developed in the future that are suitable for producing image data relating to image light reflected by the object 16 being scanned. Consequently, the present invention should not be regarded as limited to any particular type of imaging system or image system configuration. However, by way of example, the optical imaging assembly utilized in one preferred embodiment of the invention includes a photodetector and a lens for directing image light onto the photodetector. The photodetector may comprise a CCD array having a resolution of 300 dpi (dots per inch), such as type TS1301, available from Texas Advanced Optoelectronic Solutions, Inc., of Plano, Tex. Alternatively, other types of detectors having the same or other resolutions could also be used.

The lens used to direct and focus the image light onto the surface of the photodetector may comprise an optical system such as the type sold under the name SELFOC which is a registered trademark of the Nippon Sheet Glass Company, Limited. Alternatively, other types of imaging systems, such as projection imaging systems involving lenses and/or reflectors, could also be used.

The image head portion 30 also includes a navigation system 12 comprising one or more position detectors, or navigators. In the preferred embodiment, the navigation system 12 comprises two navigators 44 and 46, placed parallel to the scan window 42 and inside the ends of the line formed by the scan window 42.

Referring now to FIGS. 4–7, a navigator 44 comprises a photodetector 50, a lens 52, an LED 54, and an aperture assembly 60. The LED 54 produces light rays (e.g., 56) to illuminate an area on the object 16 under the navigator 44. Image light 64 is reflected from the object 16 and is focused and directed onto the photodetector 50 by the lens 52.

The LED 54 is mounted in the image head portion 30 such that the illumination light 56 grazes the object 16 at an angle 66 between about 5 degrees and about 30 degrees (20 degrees preferred). This grazing illumination reduces specular reflections from the object 16 so that the diffuse reflections from surface irregularities are prominent.

The lens 52 preferably comprises a circular, transparent ground glass or molded plastic element to focus and reduce the image light 64 onto the photodetector 50. The lens 52 preferably has a magnification factor of about 1.4, so that a roughly 2 mm$^2$ squared area on the object 16 is focused onto the 2.88 mm$^2$ detector 50. The lens 52 is supported under the photodetector 50 by a support member 74. The support member 74 is angled back away from the lens 52 above and below the lens 52 to avoid blocking the image light 64, as well as to reduce weight and cost. A generally U-shaped flange 76 surrounds the edge 80 of the lens 52 to provide support. The support member 74 is molded of a black 30% glass fiber filled polycarbonate material. The support member 74 may be shaped as needed to suit the particular portable scanner 10 and image head portion 30 as desired. Alternatively, the lens 52 may be supported beneath the photodetector 50 in any suitable fashion.

The photodetector 50 is preferably a two-dimensional array of individual optical sensors fabricated on a single semiconductor die. The photodetector 50 is electrically connected to a printed circuit board (PCB) 70 by a group of wirebonds (e.g., 72). Alternatively, the photodetector 50 may be mounted to PCB 70 with surface mount solder connections or any other suitable method. The photodetector 50 generates image data from a small two-dimensional area 62 of the object 16 being scanned. A computer processor in the portable scanner 10 receives this image data and identifies distinct features on the object 16. In the example where the object 16 is a paper document 20 with text 22 printed thereon, the distinct features may be inherent irregularities in the surface of the paper, such as paper fibers, or the edges of printed text. The positions of these distinct features relative to the navigators 44 and 46 are stored in a memory device. As the portable scanner 10 is moved relative to the object 16, the positions of these distinct features move relative to the navigators 44 and 46. The processor compares the new positions of these distinct features to the positions stored in the memory device. Based on these comparisons, the processor is able to determine the position, direction of movement, and velocity of the portable scanner 10 to which the navigators 44 and 46 are affixed relative to the object 16. Accordingly, the processor is able to stitch together the scanned swaths imaged by the optical imaging assembly because the locations of the scan swaths relative to each other may be readily determined.

Figure 5:
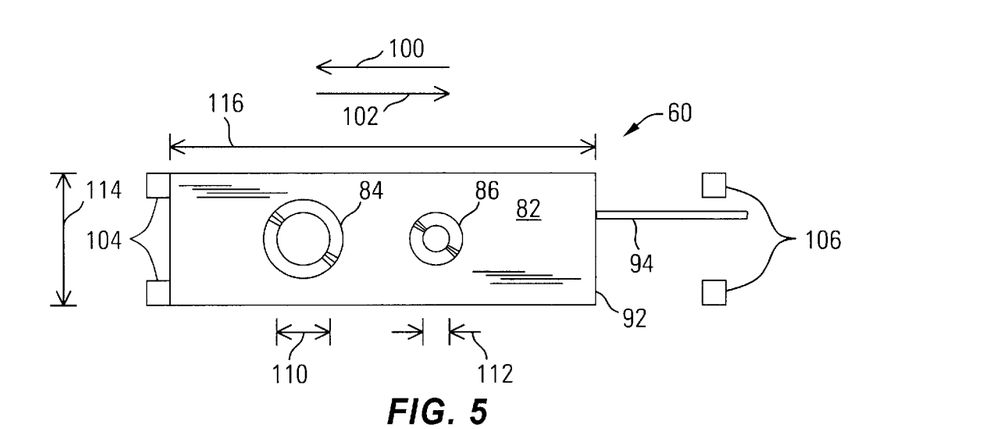
FIG. 5 is a top view of the slidable variable circular aperture of FIG. 4.

The aperture assembly 60 is positioned between the photodetector 50 and the lens 52 and is slidably supported by guide rails (not shown) on the support member 74. The aperture assembly 60 comprises a plate 82 having a plurality of fixed apertures (e.g., 84 and 86). In a preferred embodiment, the plate 82 includes two circular apertures, a larger aperture 84 and a smaller aperture 86. The plate 82 is preferably a low-cost, precision sheet metal stamping. The plate 82 may alternatively be a plastic injection molded part.

The larger aperture 84, used for darker objects 16, preferably has a diameter 110 of about 1.5 mm, while the smaller aperture 86, used for lighter objects 16, has a diameter 112 of about 1.0 mm, so that the larger aperture 84 passes roughly twice the image light 64 as the smaller aperture 86. Alternatively, the diameters 110 and 112 of the apertures 84 and 86 may be sized to pass any desired amounts of navigator image light 64.

The apertures 84 and 86 are also sized small enough that image light 64 which passes through the edges of the lens 52, near the support member 74, is blocked. For example, the largest aperture 84 may be sized to pass all image light 64 except for that which passes within k mm of the support member 74.

The plate 82 has a width 114 sufficient to block undesired image light 64 from the lens 52, passing image light 64 only through an aperture 84 or 86. The plate 82 also has a length 116 sufficient to block undesired image light 64 from the lens 52, passing image light 64 only through a single aperture 84 or 86 at a time. In a preferred embodiment, the plate 82 has a width 114 of about 5.0 mm and a length 116 of about 10.0 mm.

An actuator 90 is connected to a side 92 of the plate 82 by a rod 94. The actuator preferably comprises a linear actuator, such as a Smoovy® linear motor, part number APH59001, available from the RMB Miniature Bearings company of Ringwood, N.J. The actuator 90 is electrically connected to the PCB 70 by conductive wires 96, or may be surface mount soldered to the PCB 70. Control electronics in the portable scanner 10 control the actuator 90 by sending electrical signals across the wires 96. The actuator 90 is supported by the PCB 70, or, alternatively, may be supported by the support member 74. The actuator 90 causes the plate 82 to slide back and forth under the photodetector 50 along directions 100 and 102 by extending and retracting the rod 94.

Stop blocks 104 and 106 connected to the support member 74 help align the plate 82 and position either the larger aperture 84 or the smaller aperture 86 under the photodetector 50.

Figure 6:
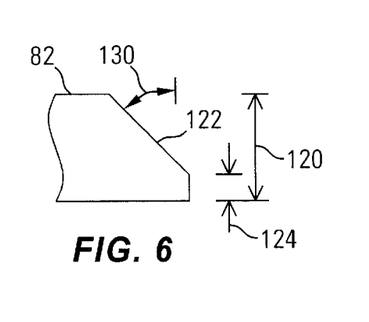
FIG. 6 is a side view of an aperture having a chamfer on the top edge.
Figure 7:
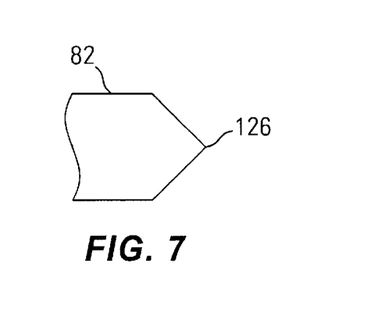
FIG. 7 is a side view of an aperture having a chamfer on the top and bottom edges.

Referring primarily now to FIGS. 6 and 7, the plate 82 has a thickness 120 of about 1 mm. A chamfer 122 is also provided on the inner wall of the apertures 84 and 86, so that the apertures 84 and 86 essentially appear as thin as possible to the image light 64. If the apertures 84 and 86 are too thick, the image light 64 will be degraded by secondary reflections on the aperture walls. Furthermore, thick aperture walls cause the effective aperture size to vary depending on the angle of the image light 64.

In the preferred embodiment, shown in FIG. 6, the upper edge of the aperture wall is chamfered so that the inner aperture wall is located at the bottom of the plate 82 and has a thickness 124 of about 0.25 mm. The chamfer is preferably cut at an angle 130 between about 30 degrees and about 60 degrees.

Alternatively, as shown in FIG. 7, both the upper and lower edges of the aperture wall may be chamfered so that the aperture wall 126 is a point roughly midway through the plate 82. This alternative embodiment does provide a thinner effective aperture, but manufacturing is complicated since two chamfers must be cut, rather than one. In addition, the aperture diameter is more difficult to control precisely when cutting chamfers, as in FIG. 7, rather than drilling, as in the manufacture of the first embodiment shown in FIG. 6.

The aperture assembly 60 is controlled by firmware in the portable scanner 10 according to one or more control variables, such as the level of light incident on the photodetector 50 or on a separate light level detector (not shown) which may be mounted near or on the photodetector 50. In this embodiment, the aperture assembly 60 is adjusted to the smaller aperture size when the level of light increases and to the larger aperture size when the level of light decreases.

However, the preferred control variable is the "bowl depth," a metric related to correlation coefficients produced during processing of the navigation images, as will now be discussed in detail.

Figure 8:
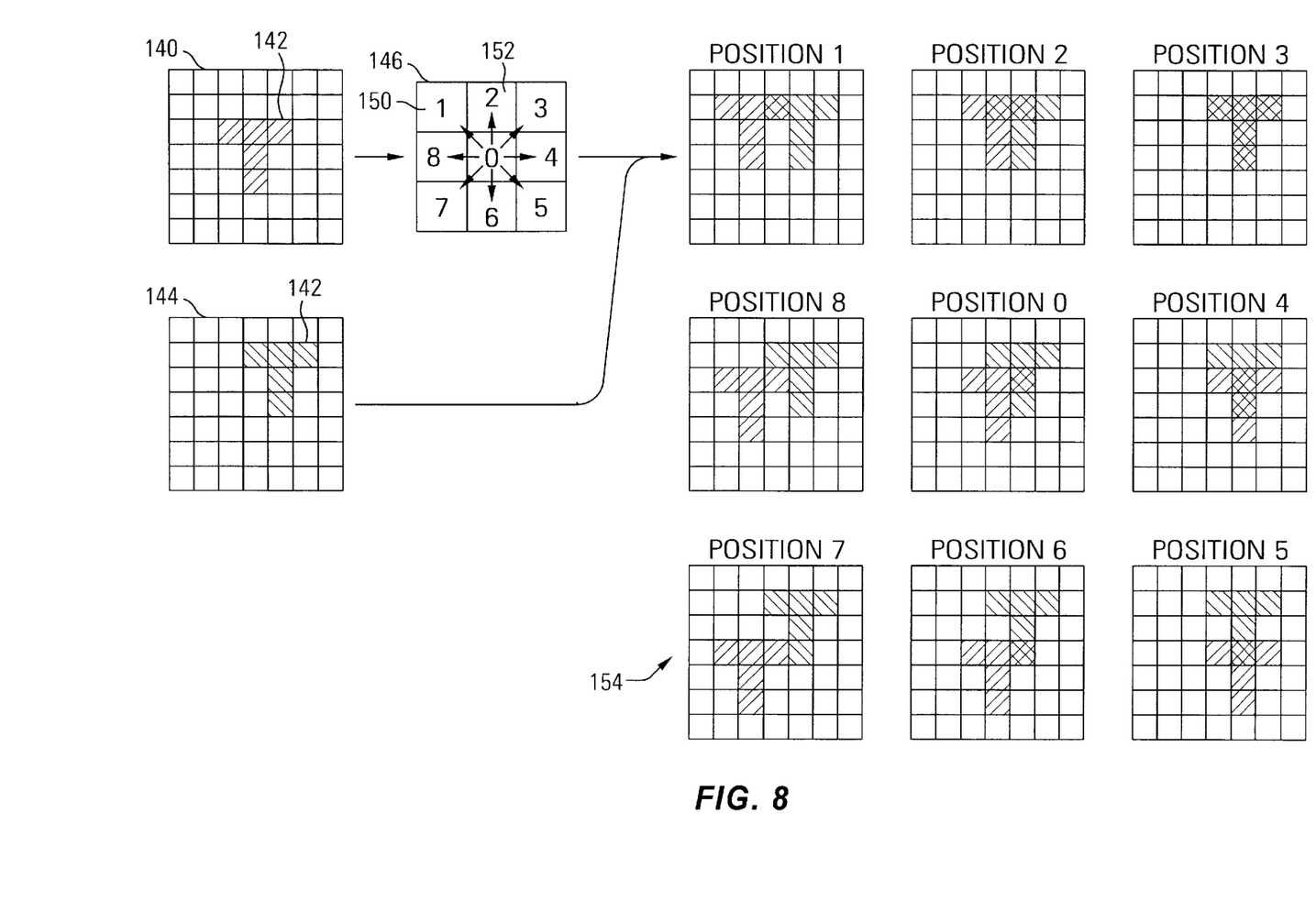
FIG. 8 is a schematic view of the navigation process in a portable scanner.

Referring now to FIG. 8, the motion of the portable scanner 10 is determined by correlating sample frames or images with reference frames which are taken prior to the sample frames and then shifted. A reference frame 140 is first stored. In the present example, the reference frame 140 includes a T-shaped feature 142 of the object 16.

After the reference frame 140 is stored, and after the portable scanner 10 has moved slightly, a sample frame 144 showing the same T-shaped feature 142 of the object 16 is stored. Thus, the T-shaped feature 142 shown in the center of the reference frame 140 is shifted up and right in the sample frame 144 due to movement of the portable scanner 10 down and left over the object 16. The time between storing the reference frame 140 and the sample frame 144 is preferably short enough that the portable scanner 10 has not moved more half a pixel width. However, the movement in FIG. 8 is exaggerated for clarity.

The sample frame 144 is then combined with shifted versions (e.g., 150 and 152) of the reference frame 140 to determine the degree of correlation between the sample frame 144 and the shifted reference frames (e.g., 150 and 152). By shifting the reference frame 140 in known directions and distances, then determining which shifted reference frame (e.g., 150 and 152) correlates most closely with the sample frame 144, the actual movement of the portable scanner 10 can be determined. For example, if the reference frame 140 is shifted one pixel to the left, and the sample frame 144 correlates exactly with the left-shifted reference frame 140, then the portable scanner 10 has been moved one pixel to the right between the time the reference frame 140 and the sample frame 144 were stored.

Eight shifted reference frames (e.g., 150 and 152) and one unshifted reference frame are prepared as indicated the shifting diagram 146 of FIG. 8. The reference frame 140 is shifted into the eight neighboring pixels. In position "1" 150, the reference frame 140 is shifted to the upper left neighboring pixel. In position "2" 152, the reference frame 140 is shifted to the upper neighboring pixel, etc. Position "0" is the unshifted reference frame 140. The reference frame in nine positions (0–8) is thus prepared. The sample frame 144 is then combined with the nine prepared reference frames to form a 3×3 array of combined frames 154. The combined frame at position "3" has the smallest number of shaded pixels (five), thus has the highest correlation, and the combined frame at position "7" is among the frames with the highest number of shaded pixels (ten), thus with the lowest correlation.

A set of correlation coefficients are calculated for the nine combined frames in the array 154, according to the following equation which squares the differences and sums them:

$$Ck = \sum_i \sum_j (S_{ij} - R_{(ij)+k})^2$$

where $S_{ij}$ is the value measured by the photodetector 50 at position ij of the sample frame 144, and $R_{ij}$ is the value measured by the photodetector 50 at position ij+k of the reference frame 140 shifted in direction k. According to this equation, the combined frame with the highest correlation, in this case position "3," will have the lowest correlation coefficient, and the combined frames with lower correlation will have higher correlation coefficients.

In actual practice, the sample frame 144 will not correlate exactly with any of the shifted reference frames (e.g., 150 and 152) because the sample frame 144 is stored before the portable scanner 10 moves a full pixel width, and because it is unlikely that the portable scanner 10 will be moved in exactly the same direction that one of the shifted reference frames (erg., 150 and 152) were shifted. However, the actual movement of the portable scanner 10 can be calculated by interpolating between the correlation coefficients.

Figure 9:
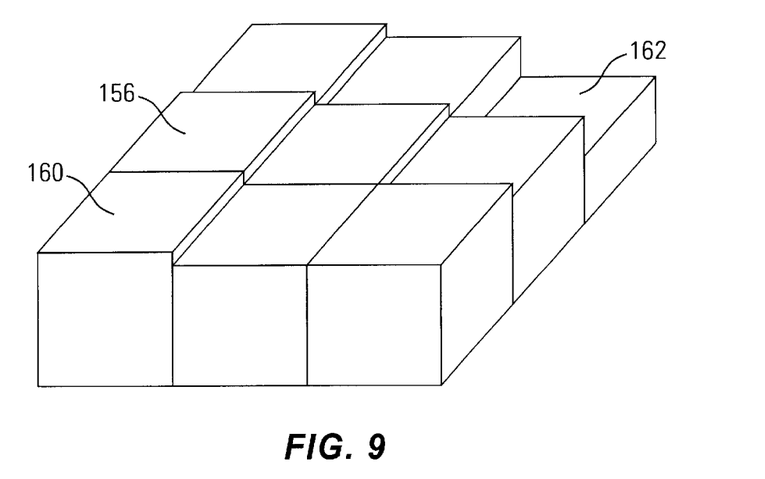
FIG. 9 is a chart illustrating correlation coefficients produced during the navigation process of FIG. 8.
Figure 10:
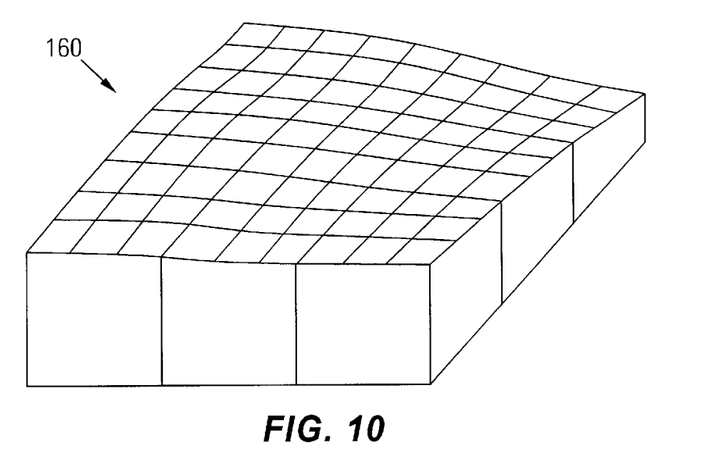
FIG. 10 is a surface corresponding to the chart of FIG. 9.

Continuing the example of FIG. 8, a bar chart of the nine correlation coefficients is shown in FIG. 9. The highest correlation coefficients 156 and 160 correspond to positions "8" and "7" in FIG. 8, and the lowest correlation coefficient 162 corresponds to position "3" in FIG. 8. A smooth best-fit surface 164 is calculated for the nine correlation coefficients, as illustrated in FIG. 10. The bowl-depth 166 (FIG. 11) is then determined. The bowl-depth 166 may be found by taking a cross-section of the best-fit surface 164 from highest to lowest point.

Figure 11:
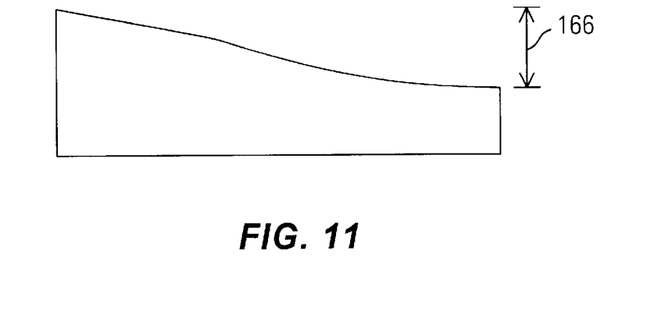
FIG. 11 is a two dimensional graph illustrating the bowl depth of the surface of FIG. 10.

Note that the cross-section illustrated in FIG. 11 is not bowl shaped, since in the present example the portable scanner 10 was allowed to move an entire pixel between storage of the reference frame 140 and sample frame 144. However, in actual practice, sample frame 144 is stored before the portable scanner 10 has moved more than a half pixel width, so the lowest correlation coefficient will be in position "0." The smooth best-fit surface 164 will have a low point near the center of the surface 164, forming a bowl shape, although the low point will only be at the center of the surface 164 if the portable scanner 10 did not move at all.

It may be advantageous to determine the bowl depth 166 as the height between the lowest correlation coefficient 162 and the average value of the remaining correlation coefficients (e.g., 156 and 160).

Having described the calculation of bowl-depth 166, the operation of the portable scanner 10 having a navigation system 12 with a variable aperture 14 illustrated in FIGS. 4 and 5 will now be described in more detail. The portable scanner 10 is placed against the object 16 and the scanning operation is initialized, as discussed above. During initialization of the scanning operation, the aperture assembly 60 is placed in a default position for white printer paper. Firmware in the portable scanner 10 sends an electrical signal to the actuator 90 across the wires 96, causing the actuator 90 to extend the rod 94 attached to the plate 82. The plate 82 is thereby slid in direction 100 until it reaches the left stop blocks 104, positioning the smaller aperture 86 under the photodetector 50.

As the portable scanner 10 is moved across the object 16 and the navigator 44 tracks the movement, the firmware monitors the desired control variable, whether the intensity of image light 64 or the bowl-depth 166. When the control variable reaches a predetermined value indicating that the object 16 is dark enough to require a larger aperture, the aperture assembly 60 is adjusted. The firmware sends an electrical signal to the actuator 90 across the wires 96, causing the actuator 90 to retract the rod 94 attached to the plate 82. The plate 82 is thereby slid in direction 102 until it reaches the right stop blocks 106, positioning the larger aperture 84 under the photodetector 50.

The actuator 90 must move the plate 82 quickly enough that the navigation process is not disrupted. The aperture assembly 60 is preferably adjusted between the regular periodic capture and storage of sample frames 144 and reference frames 140 to avoid disrupting the navigation process. Alternatively, if the aperture assembly 60 cannot be moved quickly enough to avoid disrupting the regular periodic capture and storage of sample frames 144 and reference frames 140, adequate results may be obtained by interpolating between navigation information before and after the aperture adjustment.

The aperture assembly 60 is thus adjusted back and forth between the larger aperture 84 and the smaller aperture 86 as needed as the portable scanner 10 is moved across the object 16. Alternatively, the aperture assembly 60 may be adjusted to one aperture 84 or 86 at the beginning of the scanning operation and left in that position during the entire scanning operation.

In another embodiment (not shown), the aperture assembly 60 may be manually controlled by removing the actuator 90 and extending the rod 94 to a lever on the exterior of the portable scanner 10. In this case, the aperture assembly 60 may be manually set for light or dark objects before the scanning operation as desired or as directed by the portable scanner 10.

Figure 12:
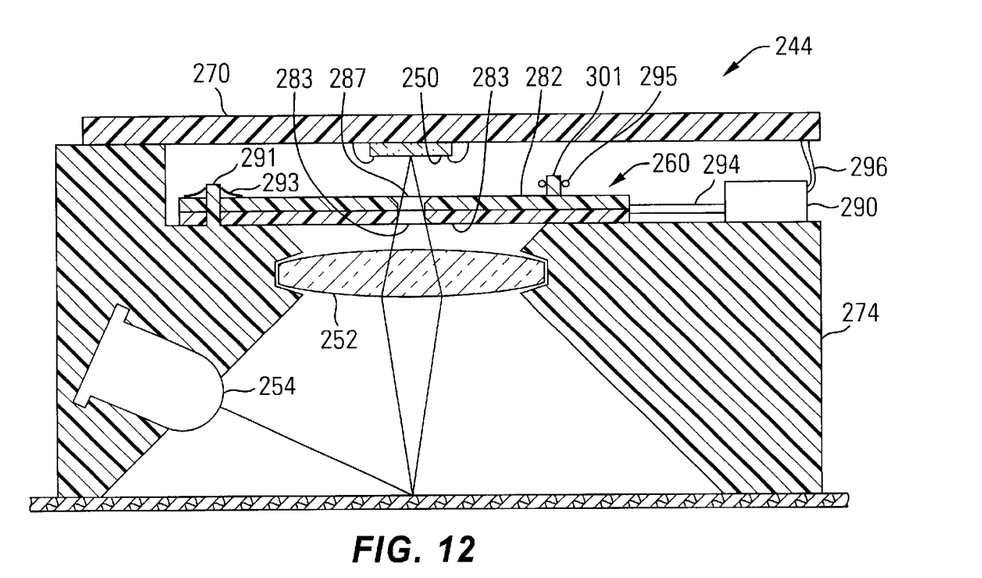
FIG. 12 is a cross-sectional side view of a portable scanner navigator with a scissor-action variable circular aperture.
Figure 13:
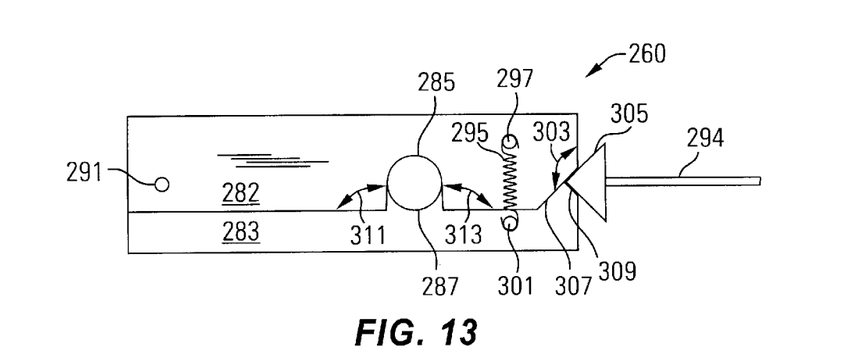
FIG. 13 is a top view of the scissor-action variable circular aperture of FIG. 12 in the closed position.
Figure 14:
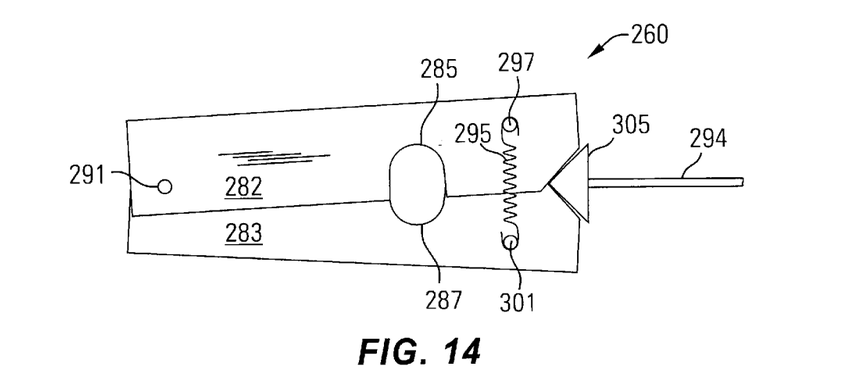
FIG. 14 is a top view of the scissor-action variable circular aperture of FIG. 12 in an open position.

Referring now to FIGS. 12, 13, and 14 simultaneously, another embodiment of a navigator 244 having a variable aperture comprises a photodetector 250, a lens 252, an LED 254, and an aperture assembly 260. The LED 254, lens 252, and photodetector 250 operate as described above with respect to FIG. 4. The lens 252 is supported by a support member 274, and the photodetector 250 is mounted to a PCB 270 as described above.

The aperture assembly 260 is positioned between the photodetector 250 and the lens 252 and is slidably supported by guide rails (not shown) on the support member 274. The aperture assembly 260 comprises a pair of overlapping movable plates 282 and 283. (The aperture assembly 260 may be configured with any number of plates greater than one, as desired.) The pair of plates 282 and 283 are held to the support member 274 and to each other by a pivot pin 291, about which the plates 282 and 283 may be rotated. The plates 282 and 283 are held onto the pivot pin 291 by a clip 293. Each of the plates 282 and 283 have an opening 285 and 287, which combine to form the walls of an aperture whose size can be changed by pivoting the plates 282 and 283 around the pivot pin 291. The openings 285 and 287 are placed at the near edges of the plates 282 and 283, respectively, and are roughly U-shaped so that in the closed position the aperture is circular (see FIG. 13), and in the more open position the aperture is generally oblong (see FIG. 14). The bases of the U-shaped openings 285 and 287 roughly form half-circles. The arms of the U-shaped openings 285 and 287 preferably form angles 311 and 313 of just over 90 degrees, so that the resulting aperture has smooth edges when in the open position. By moving the plates 282 and 283 toward and away from each other in a scissor-type movement, the aperture size can be smoothly varied.

A return spring 295 is affixed between two posts 297 and 301 which extend from the plates 282 and 283, respectively. The return spring 295 exerts a force on the plates 282 and 283, pulling them together into the closed position. The corners 307 and 309 of the plates 282 and 283 opposite the pivot pin 292 and nearest each other are beveled back at an angle 303 of about 135 degrees, so that together the beveled ends form a V-shaped notch. A triangular shaped plunger 305 is attached to the end of an actuator rod 294 and engages in the V-shaped notch. As the rod 294 is pressed toward the plates 282 and 283, the plunger 305 presses against the beveled corners 307 and 309, forcing the plates 282 and 283 apart and enlarging the aperture (see FIG. 14). As the rod 293 is retracted the plunger 305 no longer presses against the beveled corners 307 and 309 and the plates 282 and 283 are pulled together by the spring 295 (see FIG. 13).

An actuator 290 is connected to the actuator rod 294 and plunger 305 to automatically open and close the plates 282 and 283. The actuator 290 is electrically connected to the PCB 270 by conductive wires 296, or may be surface mount soldered to the PCB 270. The actuator 290 is controlled as described above with respect to FIG. 4.

Figure 15:
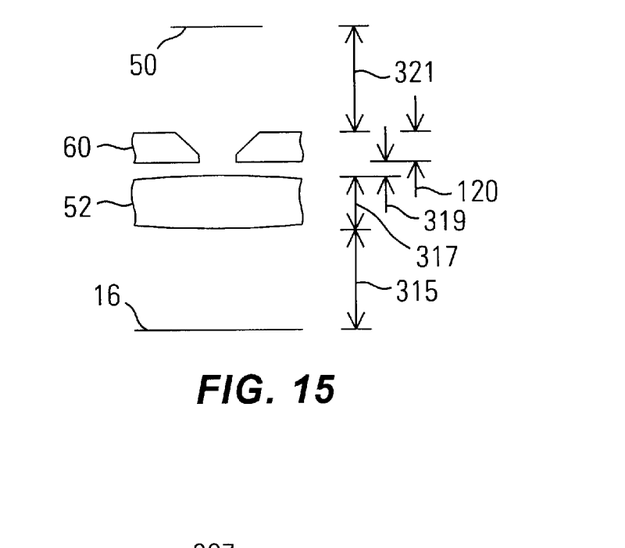
FIG. 15 is an elevation diagram of a portable scanner navigator illustrating the vertical placement of the navigator elements.

The preferred vertical spacing of the elements of the aperture assemblies 60 and 260 described herein is illustrated in FIG. 15. The object 16 is located at a distance 315 of about 3.5 mm below the lower surface of the lens 52. The lens 52 has a thickness 317 of about 2.2 mm. The lower surface of the aperture assembly 60 is located at a distance 319 of about 0.5 mm above the upper surface of the lens 52. The aperture assembly 60 has a thickness 120 of about 1 mm. Finally, the detector 50 is located at a distance 321 of about 3.6 mm above the upper surface of the aperture assembly 60. In these embodiments having this preferred vertical spacing, the lens 52 has a magnification factor of about −1.4, and the detector 50 has an area of about 2.88 mm$^2$.

Figure 16:
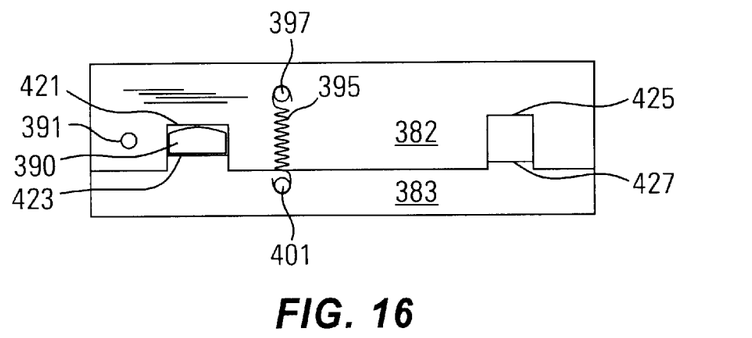
FIG. 16 is a top view of a scissor-action variable rectangle aperture which is actuated by a disk translator.
Figure 17:
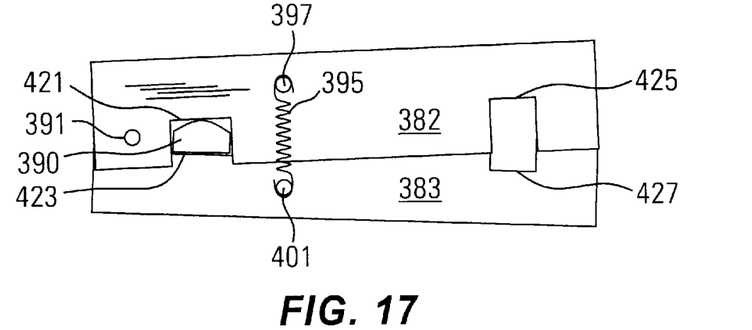
FIG. 17 is a top view of the scissor-action variable rectangle aperture of FIG. 16 in an open position.

Referring now to FIGS. 16 and 17, the plates 382 and 383 in a navigator 244 may be actuated or opened by a disk type piezoelectric actuator 390. The plates 382 and 383 are rectangularly shaped, with a return spring 395 attached to posts 397 and 401 extending from the plates 382 and 383 to bias them together into a closed position. Rectangular notches 421 and 423 are cut into the sides of the plates 382 and 383, respectively, near a pivot post 391, to form a rectangular opening in the overlapping plates 382 and 383. The disk actuator 390 is mounted in the rectangular opening on its side, so that the bottom is positioned against the notch 423 in one plate 383, and the piezoelectric expanding disk at the top of the actuator 390 presses against the notch 421 in the other plate 382. Thus, when the top of the disk actuator 390 expands, the actuator 390 grows against the notches 421 and 423 and forces the plates 382 and 383 apart.

In this embodiment, rectangular notches 425 and 427 are cut into the sides of the plates 382 and 383 at their ends most distant from the pivot post 391, forming a roughly rectangular aperture.

Figure 18:
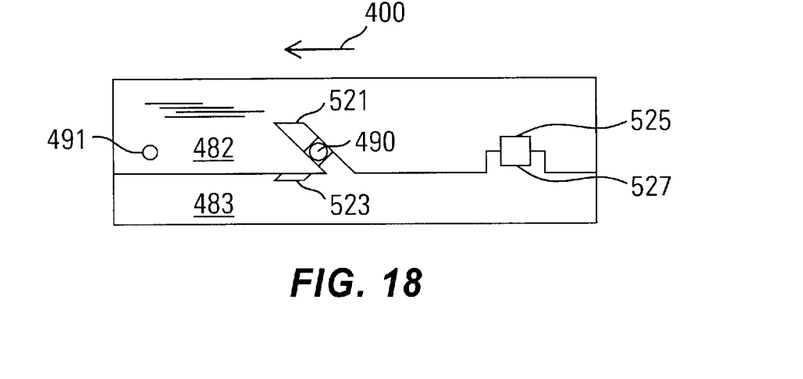
FIG. 18 is a top view of a scissor-action variable rectangle aperture which is actuated by a vertically mounted strip translator.
Figure 19:
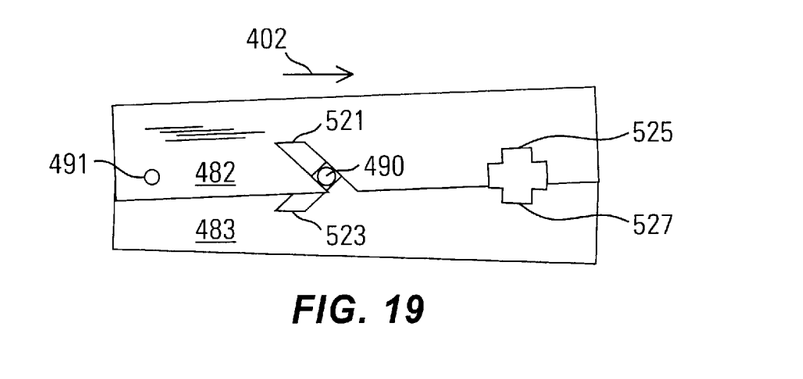
FIG. 19 is a top view of the scissor-action variable rectangle aperture of FIG. 18 in an open position.

Referring now to FIGS. 18 and 19, the plates 482 and 483 in a navigator 244 may be actuated by a bimorph piezoelectric actuator 490 or a bimetallic strip actuator. The actuator 490 is seen on end in FIGS. 18 and 19, and as an electric signal is applied to the actuator 490, it moves toward and away from a pivot post 491. The plates 482 and 483 have slots 521 and 523 cut in the sides nearest each other and near the pivot post 491. The slots 521 and 523 are angled back toward the pivot post 491 so that when overlapped, they roughly form a diamond shape in which the actuator 490 is inserted. Thus, as the actuator 490 is moved toward the pivot post 491 in direction 400 (see FIG. 18), it presses against the walls of the angled slots 521 and 523 and forces the plates 482 and 483 together to form a smaller aperture. As the actuator 490 is moved away from the pivot post 491 in direction 402 (see FIG. 19), it presses against the walls of the angled slots 521 and 523 and forces the plates 482 and 483 apart to form a larger aperture.

In this embodiment, T-shaped notches 525 and 527 are cut into the sides of the plates 482 and 483. In the closed position of the plates 482 and 483 (see FIG. 18), only the bodies of the T-shaped notches 525 and 527 overlap, forming a square or rectangular aperture. In the open position of the plates 482 and 483 (see FIG. 19), more of the T-shaped notches 525 and 527 overlap, forming a larger cruciform or addition symbol shaped aperture. If desired, the notches 525 and 527 may be dimensioned so that the widest aperture has twice the area as the smallest aperture.

Figure 20:
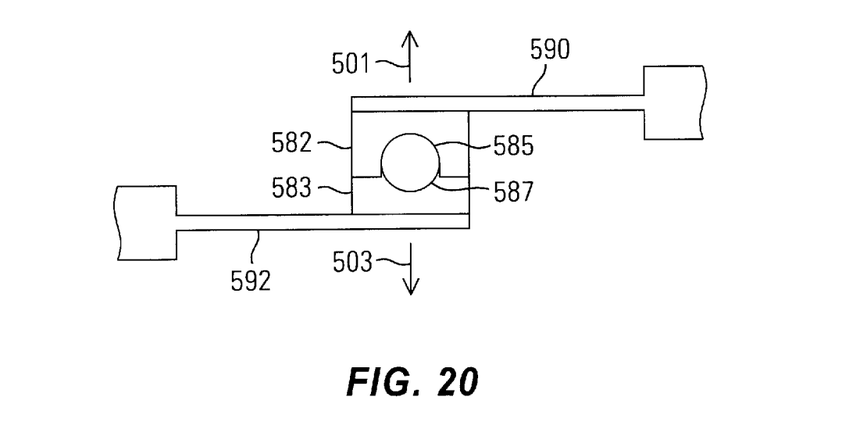
FIG. 20 is a top view of a variable circular aperture which is mounted on two strip translators.

Referring now to FIG. 20, another embodiment of a navigator 244 may comprise a pair of rectangular plates 582 and 583 mounted on bimorph piezoelectric actuators 590 and 592 or bimetallic strip actuators. The plates 582 and 583 are partially overlapping, and may be moved toward or away from each other as the actuators 590 and 592 move in opposite directions 501 and 503.

Each of the plates 582 and 583 have an opening 585 and 587, which combine to form the walls of an aperture whose size can be changed by moving the plates 582 and 583 in directions 501 or 503 toward and away from each other. The openings 585 and 587 are roughly U-shaped so that in the closed position the aperture is circular and in the more open position the aperture is generally oblong.

Figure 21:
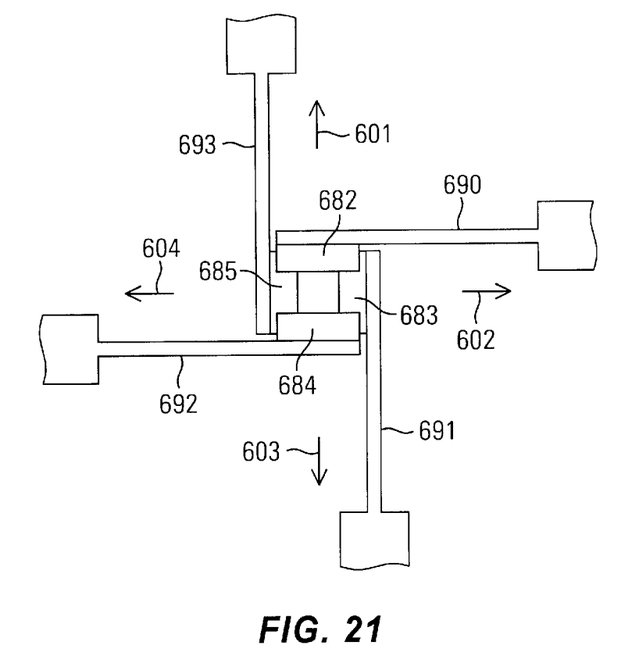
FIG. 21 is a top view of a variable square aperture which is mounted on four strip translators.

Referring now to FIG. 21, another embodiment of a navigator 244 may comprise four rectangular plates 682, 683, 684, and 685 mounted on bimorph piezoelectric actuators 690, 691, 692, and 693 or bimetallic strip actuators. The plates 682, 683, 684, and 685 are partially overlapping, and may be moved toward or away from each other as the actuators 690, 691, 692, and 693 move in opposite directions 601, 602, 603, and 604. The plates 682, 683, 684, and 685 have no notches, and form a square aperture of varying size if the plates 682, 683, 684, and 685 are moved equal distances in opposite directions. The plates 682, 683, 684, and 685 may also be moved different distances if desired to create a rectangular aperture.

Referring now to FIGS. 22–26, another embodiment of a navigator 244 having a variable aperture comprises a photodetector 750, a lens 752, an LED 754, and an aperture assembly 760. The LED 754, lens 752, and photodetector 750 operate as described above with respect to FIG. 4. The lens 752 is supported by a support member 774, and the photodetector 750 is mounted to a PCB 770 as described above.

Figure 22:
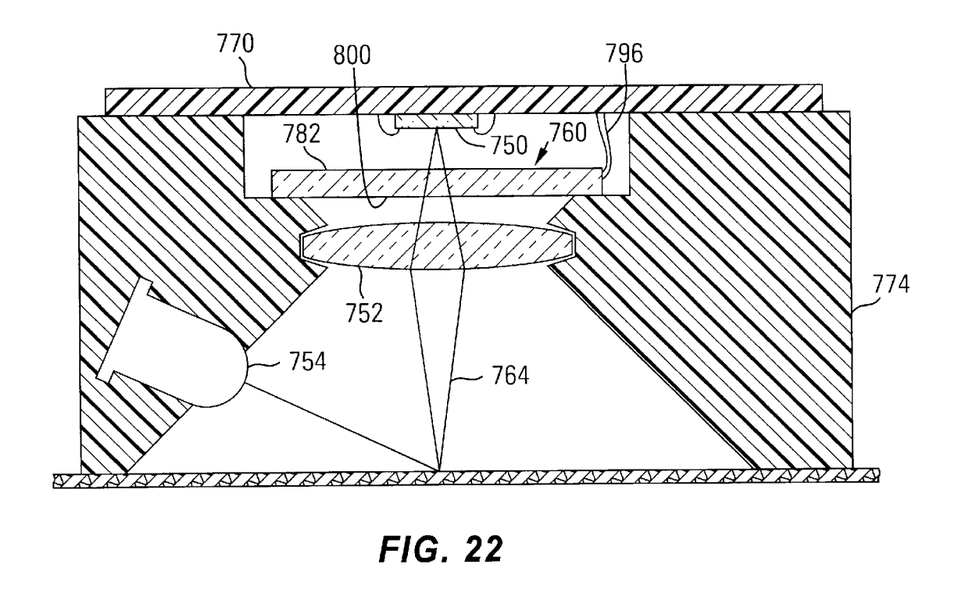
FIG. 22 is a cross-sectional side view of a portable scanner navigator with a variable electro-chromic aperture.

The aperture assembly 760 is positioned between the photodetector 750 and the lens 752 and is supported by the support member 774. The aperture assembly 760 comprises a substantially transparent substrate 782 having an electro-chromic coating 800 formed thereon. The electro-chromic coating 800 alternates between being substantially transparent and substantially opaque according to electrical signals transmitted to the substrate 782 from the PCB 770 across wires 796.

Figure 23:
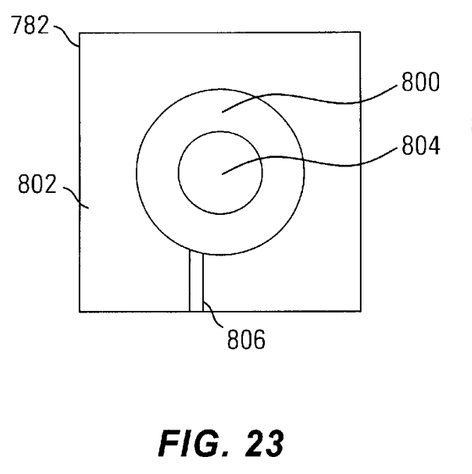
FIG. 23 is a diagram of a circular two-size electro-chromic aperture.

To form a variable aperture with two aperture sizes, as shown in FIG. 23, an opaque coating 802 is applied to the outside edges of the substrate 782, leaving a circular transparent region (e.g., 800 and 804). An annular electro-chromic coating 800 is placed inside the opaque coating 802, leaving an uncoated transparent region 804 in the center. When a voltage is applied to the annular electro-chromic coating 800 across electrical conductors (e.g., 806), the electro-chromic coating 800 becomes transparent, forming a large aperture made of regions 800 and 804 combined. When no voltage is applied to the electro-chromic coating 800, it becomes opaque, forming a small aperture made of the small uncoated center region 804.

Figure 24:
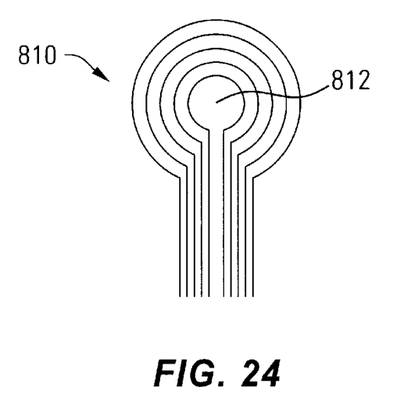
FIG. 24 is a diagram of a circular variable electro-chromic aperture.
Figure 25:
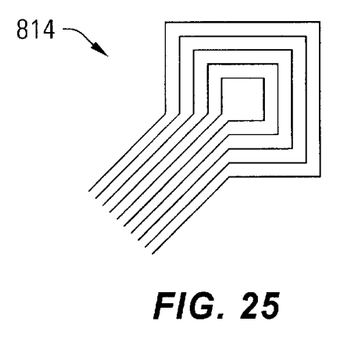
FIG. 25 is a diagram of a square variable electro-chromic aperture.
Figure 26:
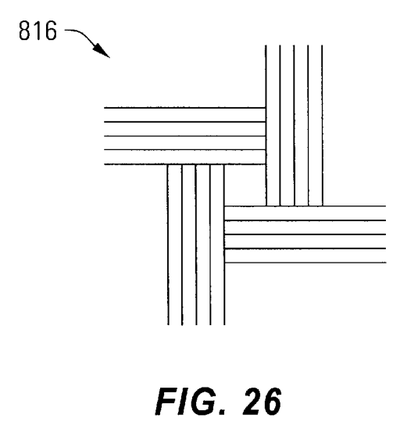
FIG. 26 is a diagram of a square variable electro-chromic aperture.

The aperture formed by the electro-chromic coating 800 may also be circular with more than two aperture sizes, as illustrated in FIG. 24. An array of electro-chromic lines 810 are arranged in circular fashion, and the center of the circular aperture is centered under the photodetector 750. To select the smallest circular aperture, all the electro-chromic lines in the array 810 are de-energized, causing them to become opaque. Thus, image light 764 can only pass through the center 812 of the circular aperture where no electro-chromic coating 800 is applied. To select progressively larger circular apertures, successive electro-chromic lines in the array 810 are turned on, beginning from the inside and moving to the outside of the array 810.

The electro-chromic coating 800 may also be applied to the substrate 782 in a square pattern 814 (FIG. 25) or in a basket-weave pattern 816 (FIG. 26) as desired to form a square or rectangular variable aperture.

The electro-chromic coating 800 is applied to the substrate 782 through any suitable process, such as in an integrated circuit manufacturing process.

While illustrative and presently preferred embodiments of the invention have been described in detail herein, it is to be understood that the inventive concepts may be otherwise variously embodied and employed, and that the appended claims are intended to be construed to include such variations, except as limited by the prior art. It should be noted that various aperture shapes may be used, as well as various actuators, in different combinations than those examples given herein, without departing from the inventive concepts disclosed.

I claim:

1. A method for varying the intensity of light incident on a navigator photodetector in a portable scanner, comprising:

providing an aperture assembly adjacent said navigator photodetector in said portable scanner, wherein said aperture assembly has a variable aperture size which may be adjusted to vary the intensity of light incident on said navigator photodetector;

determining an optimal aperture size which best enables said navigator photodetector to detect a position of said portable scanner; and adjusting said aperture assembly so that said variable aperture size is set substantially at said optimal aperture size.

2. The method of claim 1, wherein determining said optimal aperture size comprises:

combining a current image frame produced by said navigator photodetector with a plurality of previous image frames, said plurality of previous image frames being captured by said navigator photodetector simultaneously, all but one of said plurality of previous image frames being shifted in a plurality of directions;

producing a plurality of correlation coefficients indicating a degree of correlation between said current image frame and said plurality of previous image frames, said plurality of correlation coefficients indicating a direction and magnitude of movement between a time when said previous image frames were captured and current time when said current image frame was captured;

fitting a surface to a plot of said plurality of correlation coefficients;

calculating a bowl depth corresponding to a variation in a height between a highest point and a lowest point on said surface; and selecting a larger optimal aperture size if said bowl depth is small, and selecting a smaller optimal aperture size if said bowl depth is large.

3. The method of claim 1, wherein determining said optimal aperture size comprises measuring an amount of light incident on said navigator photodetector, and providing a small optimal aperture size if a large amount of light is incident on said navigator photodetector and providing a large optimal aperture size if a small amount of light is incident on said navigator photodetector.

\* \* \* \* \*